Nov. 6, 1928.
C. WEABER
1,690,762
HOG TROUGH
Filed May 2, 1927
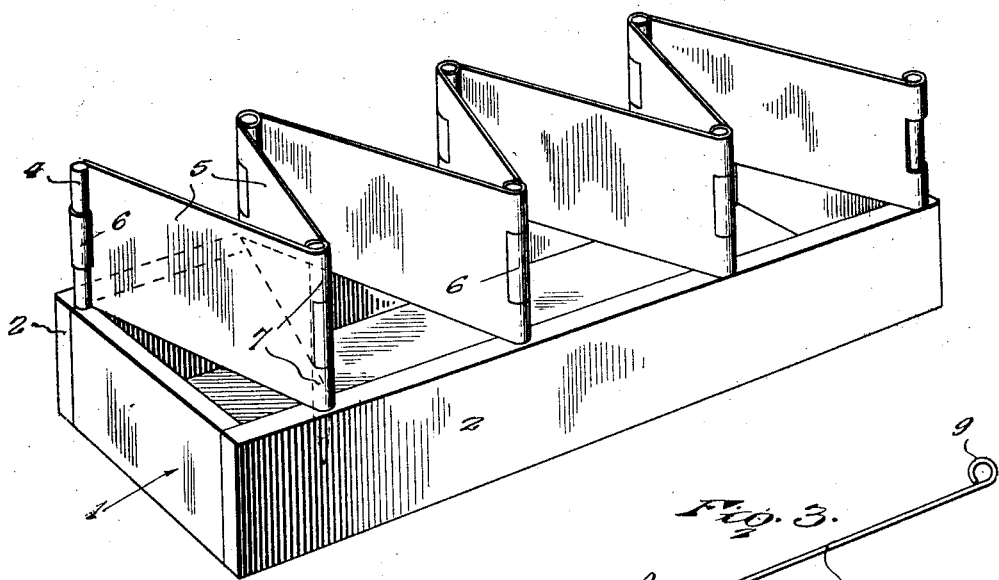
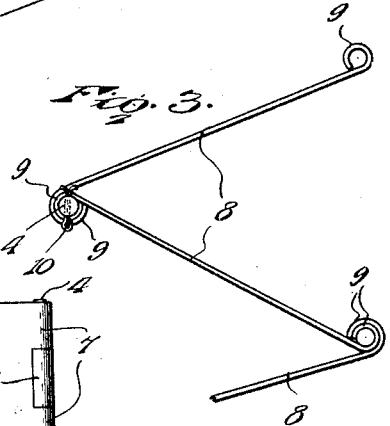
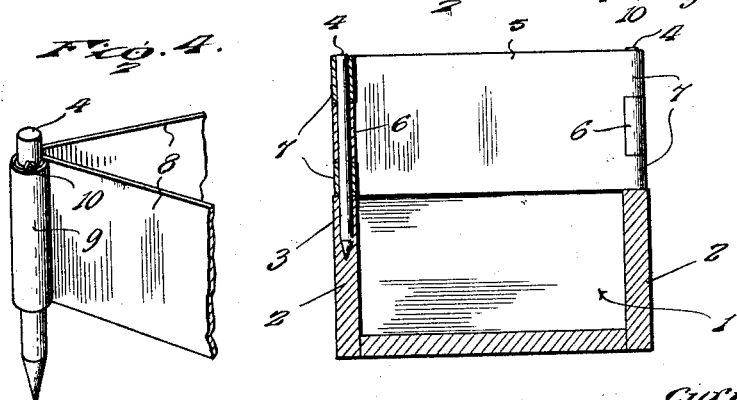
Inventor
Cyrus Weaber.
By Lacey & Lacey, Attorneys Patented Nov. 6, 1928.

1,690,762

UNITED STATES PATENT OFFICE.

CYRUS WEABER, OF PUEBLO, COLORADO.

HOG TROUGH.

Application filed May 2, 1927. Serial No. 188,322.

This invention relates to animal husbandry and more particularly to a feed trough wherein food for hogs or other animals may be placed.

When food is placed in an open trough, hogs will often stand or lie down in the trough while eating and, even when they stand at one side of the trough, they will often interfere with other hogs eating from the trough and in some instances drive other hogs away who are eating next to them and prevent them from obtaining the proper amount of food. Therefore, one object of the invention is to provide a hog trough having partitions applied thereto which extend transversely across the trough and will serve very effectively to prevent a hog from lying down in the trough and also serve to divide the trough into sections so that hogs may readily eat from the trough without being interfered with by other hogs which are standing next to them or across the trough from them.

Another object of the invention is to so form the partitions that they may be readily applied to a trough of a conventional construction and to further so construct the partitions that they may be removed from a trough and folded into a compact mass. By this arrangement the partitions, when not in use, may be stored in a small space.

Another object of the invention is to so form the partition that leaves constituting the same may be easily disconnected if it is desired to clean or repair one of the leaves or substitute a new leaf for a damaged leaf.

The invention is illustrated in the accompanying drawing, wherein

Figure 1 is a perspective view showing a feed trough provided with the improved partitions;

Fig. 2 is a transverse sectional view through the feed trough;

Fig. 3 is a fragmentary top plan view showing a modified form of partition, and

Fig. 4 is a fragmentary perspective view of the modified form of partitions.

The feed trough, which is indicated in general by the numeral 1, is of a conventional construction and may be formed of wood, metal, cement or any other desired material. Its opposed side walls 2 are drilled or otherwise formed with sockets 3 which are staggered, as shown in Fig. 1, and intended to receive posts 4 which are preferably formed of metal and project upwardly from the walls 2 of the trough. These posts constitute carriers for the partitions or leaves 5 which are preferably formed of sheet metal and at their ends are provided with tongues which are bent to form hinge sleeves 6 and 7. It should be noted that the tongues which form the sleeves 7 are bent back against the opposite face of the partition from that against which the tongue forming the sleeve 6 is bent, and therefore, when the partitions and posts are removed from the trough, the partitions or leaves may be swung about the posts into contacting engagement with each other and folded into a very compact mass which may be stored in a small space or easily shipped from one place to another.

If desired, the partitions or leaves may be formed as shown in Figs. 3 and 4. By referring to these figures, it will be seen that the leaves which are indicated by the numeral 8 are also formed of sheet metal but instead of having their end portions formed with tongues which are bent to form hinge sleeves each end portion of a partition is rolled to form a sleeve 9 extending the full depth of the partition. When this form of partition is in use, the posts extend through the sleeves at the ends of one partition and and the sleeves at the ends of companion partitions are disposed about the sleeves of the partition previously mounted. This is clearly shown in Figs. 3 and 4, and by referring to these figures it will be seen that, when it is necessary to clean or repair one of the partitions, it may be easily drawn upwardly off the mounting post without disturbing the remaining partitions and replaced after being cleaned or repaired or a new partition may be set in place if the one removed has been damaged beyond repair. A cotter pin or the like 10 may be passed through the upper end portion of each post so that the partitions or leaves will be securely held thereon and prevented from being accidentally forced upwardly and detached from the post. By an inspection of Fig. 1, it will be readily seen that, when a trough is provided with the partitions shown, it will be divided into a number of sections so that hogs may feed from the trough without being interferred with by other hogs and also that a hog will be prevented from stepping into the trough and lying down.

Having thus described the invention, I claim:

1. A feed trough having opposed walls provided with sockets, posts removably fitted into said sockets and extending upwardly from said walls, and companion leaves extending transversely across said trough in diverging relation to each other and at their ends provided with hinge sleeves fitting upon said posts whereby the leaves and posts may be removed from said trough as a unit and folded into a compact mass.

2. A feed trough having opposed walls provided with sockets, posts removably fitted into said sockets and extending upwardly from said walls, the said post being circular in cross section, and companion leaves extending transversely across said trough in vertical planes with their lower edges resting thereon and having their ends rolled to provide cooperating sleeves through which said posts pass to pivotally connect the leaves, and mount the leaves upon the trough and permit removal thereof.

3. A feed trough, posts extending upwardly from opposed walls of said trough, and partitions extending transversely across said trough and having their end portions bent to form sleeves engaged about said posts with a sleeve of one partition disposed about the sleeve of a companion partition whereby the partitions will be pivotally connected and may be slid longitudinally upon the posts and individually removed therefrom.

In testimony whereof I affix my signature.

CYRUS WEABER. [L. S.]